United States Patent [19]

Chien

[11] Patent Number: 6,002,641

[45] Date of Patent: Dec. 14, 1999

[54] APPARATUS AND METHOD FOR PLANTING SEISMIC SENSORS

[75] Inventor: Loring Chien, Katy, Tex.

[73] Assignee: Input/Output, Inc., Stafford, Tex.

[21] Appl. No.: 09/067,206

[22] Filed: Apr. 28, 1998

[51] Int. Cl.[6] .................................................... G01V 1/20
[52] U.S. Cl. ............................... 367/58; 367/49; 367/57; 367/78; 367/77
[58] Field of Search .................................. 367/37, 76, 77, 367/58, 49, 51, 78; 181/108, 112

[56] References Cited

U.S. PATENT DOCUMENTS

| | | | |
|---|---|---|---|
| 4,583,206 | 4/1986 | Rialan et al. | 367/78 |
| 5,105,391 | 4/1992 | Rice et al. | 367/58 |

*Primary Examiner*—Christine K Oda
*Assistant Examiner*—Anthony Jolly
*Attorney, Agent, or Firm*—Haynes and Boone, LLP; Todd Mattingly; Tim Headley

[57] ABSTRACT

An apparatus and method are provided for ensuring good coupling and vertically planting of seismic receivers while substantially reducing the need for interconnecting wires and costly surveys. The apparatus includes an acquisition unit (AU) 20 for measuring seismic energy and a planting member 12 for engaging and planting the AU 20. An electronic surveying instrument 14 is coupled to the planting member 12 for determining the location of the AU 20. An installer 16 plants the AU 20 in the terrain 22 in near vertical alignment using the planting member 12. Once the AU 20 is planted in near vertical alignment, coordinates are downloaded from the electronic survey unit to locate the planted AU 20.

21 Claims, 4 Drawing Sheets

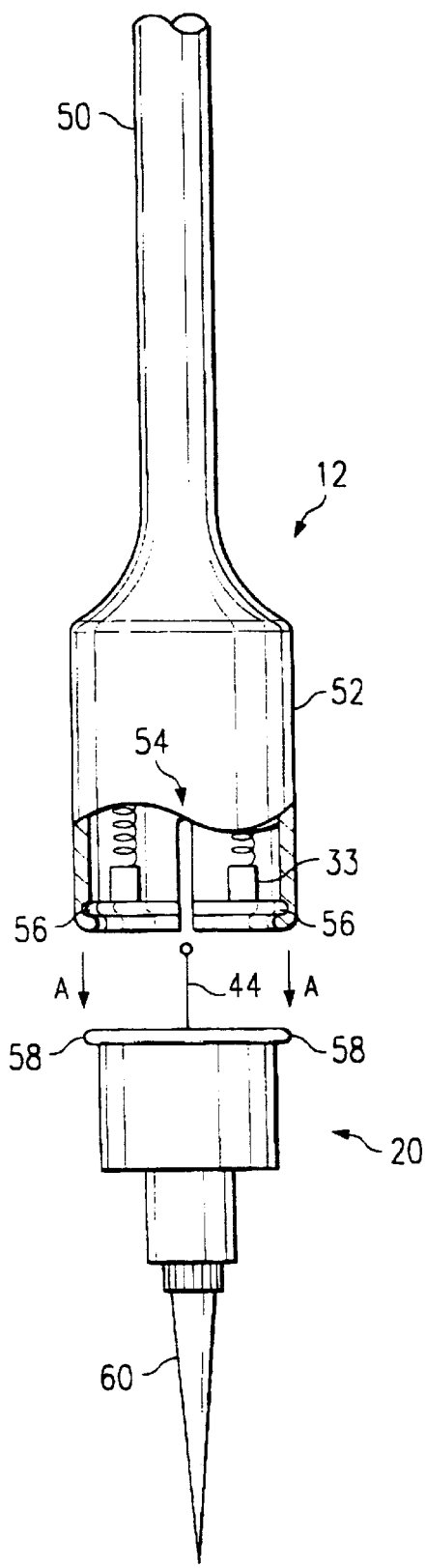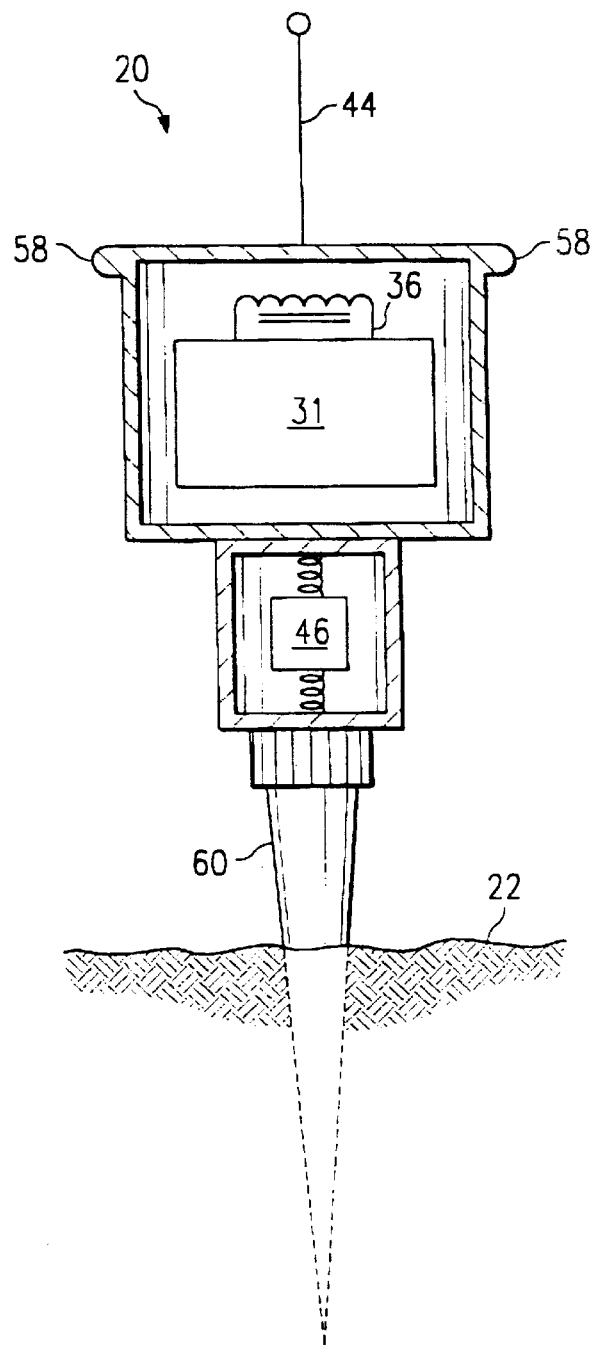
Fig. 3
Fig. 4

APPARATUS AND METHOD FOR PLANTING SEISMIC SENSORS

BACKGROUND OF THE INVENTION

The present invention relates in general to seismic sensors and, more particularly, to a method and apparatus for planting the seismic sensors in the ground in a vertical orientation.

Present methods of seismic data acquisition require surveying a field prior to installation of seismic receivers. The user surveys the field in order to determine the precise location for each of the seismic receivers. A field surveying crew selects positions for each of the seismic receivers. An installer manually plants the seismic receivers according to the locations determined by the crew. The installer must plant each of the seismic receivers in the ground in near vertical position. Failure to plant the seismic receivers in near vertical position results in faulty readings. Thus, a great deal of time and effort are expended in surveying the field and ensuring near vertical planting.

Other known methods of surveying include locating the receivers in relation to known coordinates, such as the location of an acquisition box. The location of the acquisition box is determined with a survey receiver at a relatively high cost. Once the location of the acquisition box is known, the installer measures a certain distance in a specific direction and plants the seismic receiver. Consequently, the actual location of each seismic receiver is inferred based on spatial relation to the acquisition box's location, which reduces accuracy.

Current methods require the installer to stoop down in order to plant the seismic receivers. This increases work time and costs, while reducing accuracy, because vertical alignment is difficult to determine until testing the adequacy of the vertical plant. If testing shows that the seismic receivers are not vertical, then the installer must spend more time replanting and repositioning the seismic receivers until the seismic receivers are in near vertical alignment.

Once the installation is complete, the installer runs remote tests to verify that the receivers are vertically aligned within a certain tolerance. The remote tests involve using a pulse to determine if the receiver has proper vertical alignment. The pulse moves the geophone element and the response is checked for free movement. These remote tests indicate only that a problem exists. These tests do not indicate the cause of the problem or the location of the seismic receiver causing the problem.

In addition to vertical alignment, the seismic receivers must also be planted firmly in the ground to ensure adequate coupling of the seismic energy to the seismic receivers. It is difficult for an installer to firmly plant the seismic receiver. The installer can not determine the adequacy of the coupling using known methods. The installer can not wiggle or rock the seismic receiver to determine if it has been firmly planted because wiggling or rocking the seismic receiver wallows out the surrounding ground. Wallowing causes gaps between the ground and the seismic receiver resulting in poor coupling between the ground and the receiver, which causes inaccuracy in measuring due to attenuation of the seismic energy.

Furthermore, known methods utilize a multi-channel acquisition unit to collect and transfer data collected by each of the geophones. The geophones are connected using multiple wires, which increases cost and labor effort for deployment. Additionally, the interconnecting wires can be easily damaged. If a wire is damaged the user is informed that there is a problem with the receiver. However, when a problem with the receiver is indicated, without field testing and inspection, the user can not determine whether the problem is caused by a damaged wire or a problematic geophone. Accordingly, more time and money must be spent to distinguish between errors due to the damaged wire or the problematic geophone.

Therefore, what is needed is an apparatus and a method for planting seismic receivers for both good coupling to the ground for data acquisition, and vertical planting, while substantially eliminating the need for interconnecting wires and costly surveys.

SUMMARY OF THE INVENTION

The present invention, accordingly, provides an apparatus and a method for planting seismic receivers for both good coupling to the ground for data acquisition, and vertical planting, while substantially eliminating the need for interconnecting wires and costly surveys. To this end, the apparatus includes an acquisition unit for measuring seismic energy; a planting member for engaging and planting the acquisition unit; and an electronic surveying instrument coupled to the planting member for determining the location of the acquisition unit. The method includes the steps of planting the acquisition unit in a field in near vertical alignment using the planting member, and downloading coordinates from the electronic survey unit to the planted acquisition unit.

A principal advantage of the present invention is that an installer can efficiently plant the acquisition units in near vertical alignment, and obtain good coupling between the acquisition unit and the ground. The exact location of each acquisition unit is determined as the installer plants the acquisition unit, thereby substantially eliminating the need for extensive and costly surveys prior to planting the units, and avoids costs of having a satellite survey receiver at each sensor.

The present invention eliminates wires that interconnect acquisition units, thereby reducing cost and the confusion created by an error indication associated with a wiring problem that is not readily distinguishable from an error associated with a problematic acquisition unit.

In current practice, multiple geophones (geophone arrays) are often connected to a receiver channel. Acquisition units frequently have multiple channels. Therefore multiple arrays are connected to multiple channels making a rather complex set of survey points that have to be laid out and a complex web of wiring.

The invention includes a single geophone and a single receiver channel per acquisition unit, connected internally so as to eliminate wiring requirements. Because of cheaper electronic components and functions, and the lowered costs of not having to deploy a large amount of wiring, the single geophone/single channels receiver acquisition units are an advantage, even when additional units are required to obtain similar array performance. Array characteristics normally obtained by the geophone array can be performed dynamically in the central electronics where data from all acquisition units are captured. Surveying prior to deployment can either be eliminated or reduced to simply identifying a path along which the receivers are to be deployed, because accurate surveying is done as part of deployment.

Radio synchronization, seismic data storage in the acquisition unit, and data transmission are well known in the industry in such systems as Amoco SGS, I/O System RSR, Syntron/IFP PolySeis, Eagle/Sercel Opseis, and others, and any of them can be employed in this invention as the means of acquiring and transporting the seismic data to the remote user data collection point (often called a central recorder). However, the I/O System RSR is the preferred system.

BRIEF DESCRIPTION OF THE DRAWINGS

FIG. 3 is an exploded side view illustrating the planting tool and the acquisition unit of FIG. 2.

FIG. 4 illustrates the acquisition unit of FIG. 3 planted in the ground in near vertical alignment.

DETAILED DESCRIPTION OF THE INVENTION

Figure 1:
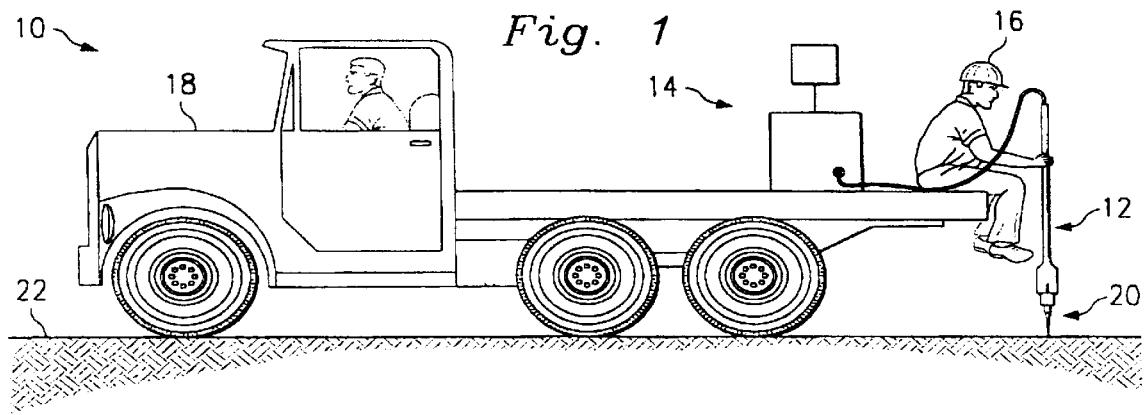
FIG. 1 illustrates an embodiment of a sensor placement system for planting an acquisition unit in near vertical alignment.

FIG. 1 illustrates a sensor placement system, generally designated 10, having a planting stick 12 and a locator system 14. The locator system 14 is mounted on a vehicle 18, but could also be located in a back-pack for easy carrying independent of the vehicle 18. Using the locator system 14, an installer 16 locates an acquisition unit (AU) 20 as discussed below. The installer 16 engages the AU 20 onto an end of the planting stick 12, which is much longer than the AU 20. This engagement of the AU 20 by the installer 16 is such that a vertical axis of the AU 20 is aligned with a vertical axis of the planting stick 12. Consequently, the vertical axis of the planting stick 12 becomes an extension of the vertical axis of the AU 20. Accordingly, small deviations of the vertical axis of the AU 20 will be amplified by the planting stick 12. By referring to the vertical alignment of the planting stick 20, the installer 16 can easily determine if the AU 20 is vertically planted. If the planting stick 12 indicates that the AU 20 is not vertical, the installer 16 replants the AU 20 in a new location to obtain the desired vertical alignment. The AU 20 is considered to be vertically planted when an angular deviation from the vertical is within an allowable tolerance margin.

Additionally, using the planting stick 12, the installer 16 can firmly plant each AU 20 deep into a surrounding earthen terrain 22 to ensure a firm plant. Firm planting of the AU 20 in the terrain 22 ensures good coupling of a seismic signal from the terrain 22 to the AU 20. Furthermore, the firm plant is easier to achieve because the installer 16 can use the plant stick 12 as a plunger to force the AU 20 into the terrain 22 without rocking the AU 20. The installer 16 must avoid rocking the AU 20 because rocking causes the AU 20 to loosen or wallow out the terrain 22, into which the AU 20 is planted. If wallowing occurs, the AU 20 loses coupling with the terrain 22. Consequently, the seismic signal being coupled from the terrain 22 to the AU 20 will be attenuated. Attenuation causes errors to appear in a recorded signal, which represents the seismic signal propagation through the terrain 22. Thus, if the AU 20 was not planted vertically, then, in order to avoid attenuation caused by wallowing, the installer 16 replants the AU 20 at a new location in the vicinity of the original planting position.

The locator system 14 determines coordinates corresponding to the location of a vertically planted AU 20 as the installer 16 plants the AU 20 in the ground 22. As the installer 16 plants the AU 20, the locator system 14 downloads the coordinates to the AU 20 if the AU 20 is vertically planted. The coordinates are sent to the AU 20 through the planting stick 12 as discussed below.

Figure 2:
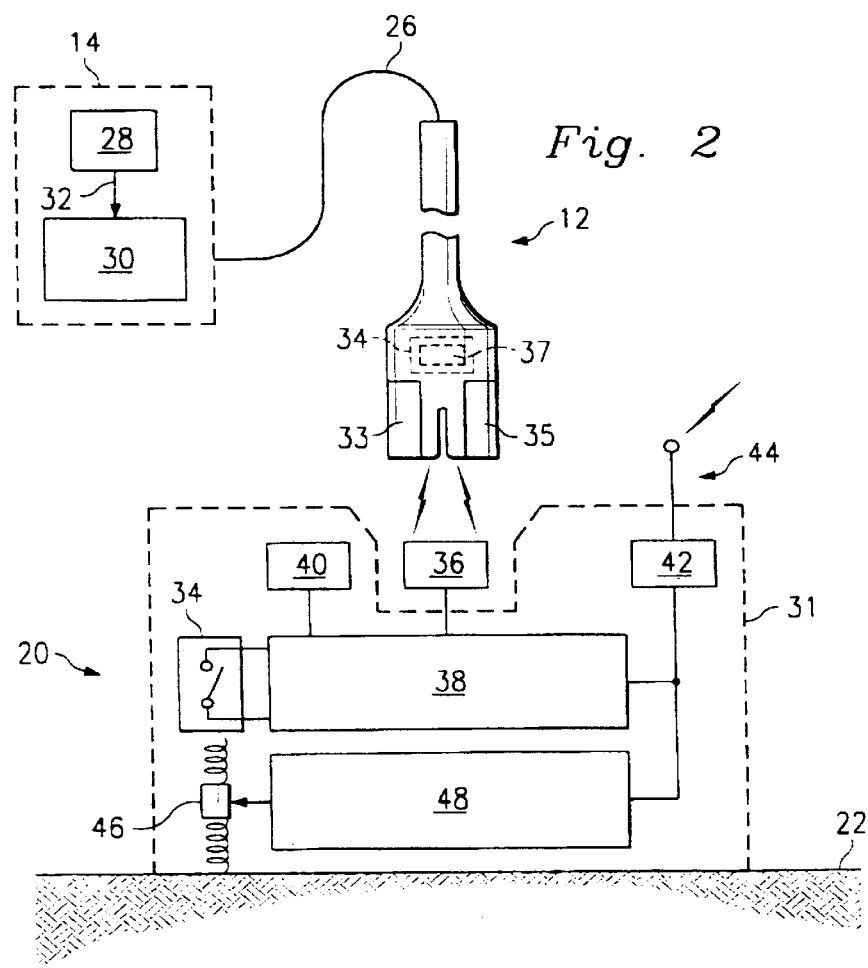
FIG. 2 is a diagrammatic view illustrating an embodiment of a planting tool, the acquisition unit, and a global satellite positioning receiver that are part of the sensor placement system of FIG. 1.

FIG. 2 diagrammatically illustrates the locator system 14 coupled to the planting stick 12 through a cable 26. The locator system 14 comprises a global positioning satellite receiver (GPSR) 28 coupled to a survey instrument-to-AU interface (SAUI) 30 through a connection 32. The GPSR 28 is preferably a model number GPS Sensor #010-10100 sold under the name Magellan GPS Sensor, and manufactured by Magellan Systems Corp., located in San Dimas, Calif. The SAUI 30 acts as a microprocessor-based instrument that can respond to signals from the AU 20. The SAUI 30 is coupled to the planting stick 12 through the cable 26, thereby coupling the GPSR 28 to the AU 20. The locator system 14 is therefore coupled to an electronic circuit 31 of the AU 20.

The GPSR 28 generates the coordinates corresponding to the present location of the AU 20 when the AU 20 generates a request signal. As the installer 16 plants the AU 20 into the terrain 22, pressure between the planting stick 12 and the AU 20 increases. A pressure sensing unit 33 in the planting stick 12 detects the increased pressure. The pressure sensing unit 33 generates a pressure signal in response to the increased pressure between the planting stick 12 and AU 20. The pressure signal travels along the cable 26 to the SAUI 30. If the installer 16 plants the AU 20 substantially vertical, then the electronic circuit 31 generates the request signal. Upon detection of the request signal and the pressure signals, the SAUI 30 triggers the GPSR 28 to obtain the coordinates corresponding to the present location of the AU 20. On the other hand, if the installer 16 does not plant the AU 20 in vertical or near vertical alignment, then the electronic circuit 31 does not generate the request signal, and the SAUI 30 does not trigger the GPSR 28. The SAUI 30 will wait until the pressure sensing unit 33 sends a second signal, indicating that the installer 16 has replanted the AU 20 in vertical or near vertical alignment. The SAUI 30 can determine if the AU 20 is substantially vertically planted based on the status of a tilt switch 34. If the AU 20 is vertical or near vertical, then the electronic circuit 31 resets the tilt switch 34. Furthermore, if the AU 20 is vertical or near vertical, the electronic circuit 31 generates the request signal indicating to the SAUI 30 that the angle of deviation from vertical is within an acceptable tolerance range. Accordingly, the SAUI 30 triggers the GPSR 28 to deliver the coordinates to the AU 20.

Alternatively, if the AU 20 deviates from the vertical by an angle exceeding the tolerance range, then the tilt switch 34 indicates to the electronic circuit 31 that the AU 20 must be replanted. The electronic circuit 31 generates and sends a replant signal to the SAUI 30. The SAUI 30 receives the replant signal and uses either a visual or an audible signal to inform the installer 16 to replant the AU 20. The SAUI 30 monitors the pressure sensing unit 33 to determine if the installer 16 has replanted the AU 20. As the installer 16 removes the AU 20 from the terrain 22, pressure between the planting stick 12 and the AU 20 decreases. The pressure unit 33 detects the decreased pressure and generates a decrease pressure signal. The SAUI 30 receives the decrease pressure signal indicating that the installer 16 is removing the AU 20 for replanting. As the installer 16 replants the AU 20, the pressure sensing unit 33 detects an increase in pressure. The pressure sensing unit 33 generates a second pressure signal to indicate that the AU 20 has been replanted. If the AU 20 is substantially vertical at the replanted position, the electronic circuit 31 signals the SAUI 30 to trigger the GPSR 28 to obtain the coordinates.

The GPSR 28 computes either absolute coordinates (latitude and longitude) or relative coordinates based on differential values. Differential values indicate the location of the AU 20 relative to the seismic sources, to other AU's already set, and to a local reference point. The GPSR 28 downloads the coordinates to the SAUI 30, which sends them along the cable 26, through the planting stick 12, to a head communication coil 35. The head communication coil 35 aligns opposite an AU communication coil 36. The planting stick 12 and the AU communication coil 36 exchange information using a non-contact coupling between them. Alternatively, they can exchange information using a contact coupling. The AU communication coil 36 sends the coordinates to a central processing unit (CPU) 38 in the AU 20. The CPU 38 stores the coordinates for later recall. Additionally, the CPU 38 monitors the tilt switch 34 to detect vertical alignment of the AU 20 in order to generate the request signal. The AU 20 has several memory locations dedicated for long-term storage of the coordinates, seismic data, tilt switch history, and other information. The memory can be either battery-backed or non-volatile RAM. A battery 40 supplies power to operate the AU 20. The AU 20 has a telemetry unit 42, coupled to the CPU 38, for information exchange. The telemetry unit 42 encodes and decodes the information for transmission and reception, respectively, through an antenna 44. For example, the AU 20 can receive and transmit information, such as recorded seismic data, to a recorder or an analysis system (not shown).

While the AU 20 is planted in the terrain 22, the AU 20 records seismic information using a geophone 46, and stores the information in a collection unit 48. Planting the AU 22 causes the geophone 46 to be coupled to the terrain 22. The geophone 46 measures the seismic energies propagating through the terrain 22. The collection unit 48 records the measured seismic energies. To ensure that the information is accurate, the AU 20 must remain vertical. The tilt switch 34 stores the history of the AU 20 and detects if the AU 20 has been moved since being planted by the installer 16. The tilt switch 34 is monitored by internal circuitry, and a tilt switch memory element (flip-flop or latch) 37 is set if the AU 20 is moved out of vertical alignment. Consequently, when the installer 16 returns and reconnects the planting stick 12 to the AU 20, the status of the tilt switch memory indicates that the AU 20 has moved out of vertical alignment. The tilt switch memory 37 acts as an electronic latch and remembers that the AU 20 was tilted out of vertical alignment even if the AU 20 returns to vertical. Accordingly, the operator can discard any data accumulated by the AU 20 when it was tilted out of vertical alignment.

The AU 20 interfaces with the planting stick 12 using the AU communication coil 36. The AU communication coil 36 of each AU 20 aligns with the head communication coil 35 of the planting stick 12. The head communication coil 35 allows the AU 20 to exchange information with the SAUI 30. The AU 20 uploads identifying information to the SAUI 30. For example, a series number or other identifying information may be uploaded. The AU 20 may also upload to the SAUI 30 certain parameters, such as operational state and status of the tilt switch 34. Alternatively, the AU 20 and the planting stick 12 can exchange information using an RF-coupling via coils, an RF-coupling through the antenna 44, an optical coupling using light emitting diodes or a photo diode, or an ultrasonic coupling.

FIG. 3 illustrates the planting stick 12 with a handle portion 50 and a head portion 52. The planting stick 12 has a hollow portion 54 for receiving the antenna 44. Alternatively, the antenna 44 can be located on a side of the AU 20. The head portion 52 of the planting stick 12 has a plurality of notches 56. The planting stick 12 is moved in the direction AA, and the notches 56 engage a mating plurality of catches, or a circular lip 58 on the AU 20 to securely mount the AU 20 onto the head portion 52 of the planting stick 12. Once the planting stick 12 has engaged the AU 20, the installer 16 grips the handle portion 50 and firmly plants or stabs the AU 20 into the terrain 22, FIG. 4, such that a spike 60 of the AU 20 penetrates the terrain 22 to ensure a deep penetration into, and good coupling with, the terrain 22. If the tilt switch 34 indicates a good plant, i.e., a vertical plant within the allowable tolerance margins, then the installer 16 releases the AU 20 using a trigger release (not shown) located in the planting stick 12. Alternatively, the planting stick 12 can automatically release the AU 20.

FIG. 4 illustrates the AU 20 planted in the terrain 22 in vertical alignment and detached from the planting stick 12. As indicated above, the spike 60 provides coupling between the AU 20 and the terrain 22. The geophone 46 detects ground motion, such as seismic energy, and couples the ground motion to the electronic components 31 for recording. The transceiver 42 and the antenna 44 allow communication of commands, such as acquisition control commands and synchronization information, to and from a remote user, as well as data transmission. Seismic data can be extracted in near-real time. However, the AU 20 can also utilize internal memory to store the data for retrieval at a later time.

In operation, the installer 16 may be on foot and use the planting stick 12 with a satchel containing several of the AU 20 devices for planting and a backpack-mounted version of the locator system 14 to download coordinate information. Alternatively, the installer 16 may ride in the back of vehicle 18 and plant the AU 20 devices, as illustrated in FIG. 1. If the AU 20 needs to be replanted due to improper vertical alignment, then the SAUI 30 issues audible or visual instructions to the installer 16 to replant the AU 20. Once the SAUI 30 confirms an acceptable vertical plant, then it triggers the GPSR 28 to download the coordinates to the AU 20. The AU 20 stores the coordinates. The installer 16 achieves an acceptable vertical plant deep in the terrain 22 because of the length, and the plumb-bob effect, of the planting stick 12.

The AU 20 can determine if it has moved since planting. The tilt switch 34 in the AU 20 detects and sets an electronic latch to indicate that the AU 20 moved out of acceptable vertical alignment after planting. The tilt switch 34 determines if the AU 20 moved, because as the operator picks up and moves the AU 20, the AU 20 will typically tilt away from vertical, thereby causing the angle of vertical alignment to deviate by more than the allowed tolerance margins. The tilt switch 34 also provides a means of quality control to ensure that the information gathered by the AU 20 after being planted is accurate. If the AU 20 tilts out of acceptable vertical alignment, then the tilt switch memory 37 will latch such that the occurrence will be stored in an internal electronic memory element (e.g., a flip flop) and indicate such an event. The AU 20 relays the history information to the user along with the seismic data thereby allowing the user to validate the seismic data. Should the remote user data collection system detect that the tilt switch memory 37 has been engaged, then the operator may elect to send a repair crew out to replant the sensor, or simply disregard the data if sufficient data is available from the other sensors. When the installer 16 reconnects the planting stick 12 to the AU 20, the history relating to the tilting of the unit since last planted can be retrieved, and stored seismic data can also be retrieved. If the AU 20 is reconnected to the plant stick 12 as a repair to re-plant a sensor which has been moved, then the procedure of replanting will clear the latch status of the tilt switch memory 37, such that the remote user will see that there is no history of being tilted since the last plant.

Advantages of the present invention include the ability to download coordinates to the AU 20 because the AU 20 is typically not moved during a seismic survey. Downloading the coordinates to the AU 20 eliminates the need for embedding geographical survey electronics in each AU 20 thereby reducing the size, the power consumption, and cost associated with each AU 20. Downloading the coordinates also substantially eliminates the need for a field survey to locate the position of each AU 20. Vertical placement of the AU 20 and coupling to the terrain 22 is improved because the AU 20 is planted into the ground from a standing (not shown) or riding position, FIG. 1, rather than bending over. Thus, productivity improves because the installer 16 does not have to bend down, which takes time and causes fatigue.

Figure 5:
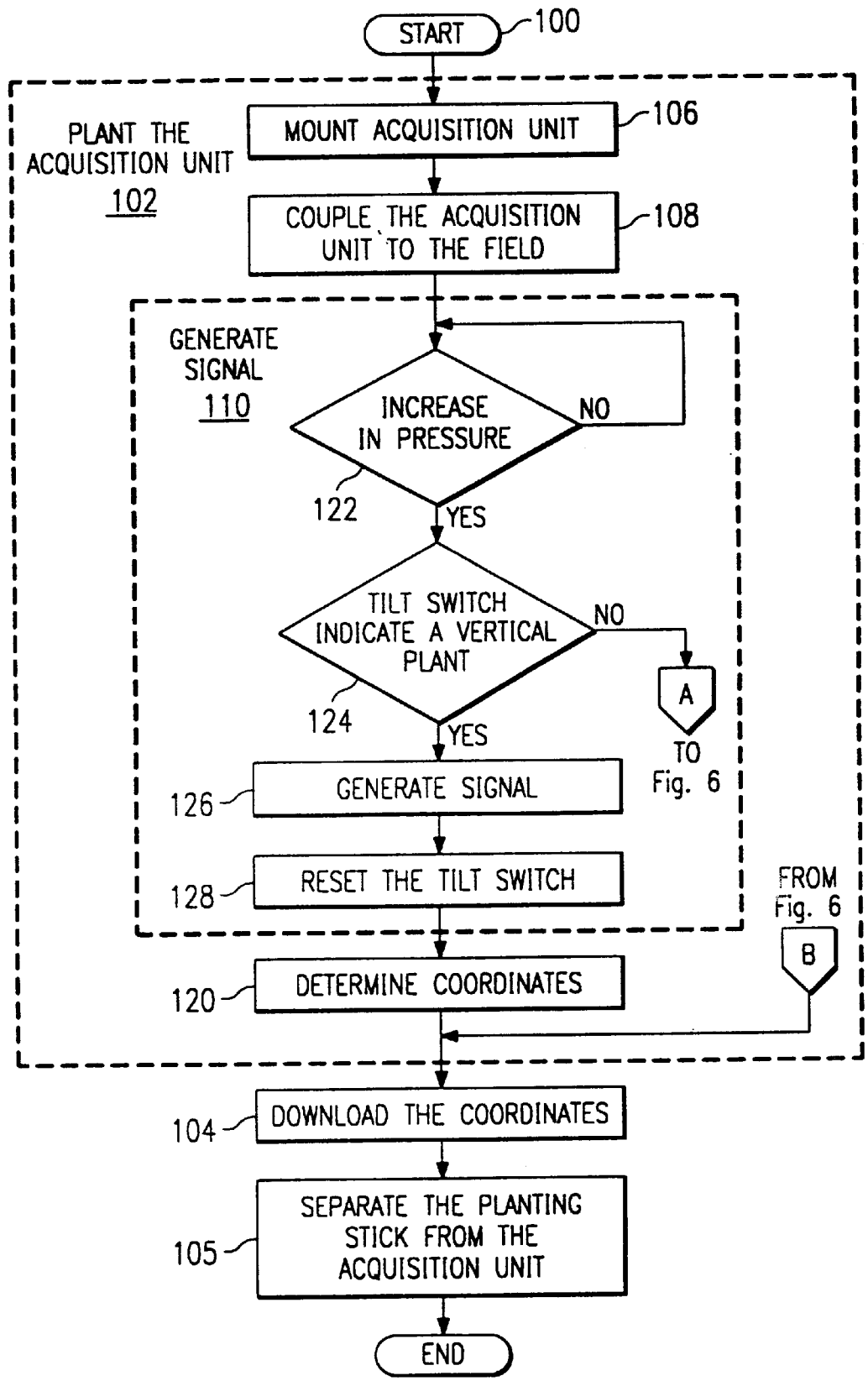
FIG. 5 is a flowchart indicating the process of planting and downloading coordinates to the acquisition unit.

In FIG. 5, the process begins at step 100. At step 102 the installer 16 vertically plants the AU 20 in the terrain 22. At step 104 the SAUI 30 retrieves and downloads the coordinates to the vertically planted AU 20. At step 105 the planting stick 12 is separated from the AU 20. In order for the installer 16 to vertically plant the AU 20 at step 102 the installer 16 mounts the AU 20 onto the planting stick 12 at step 106. At step 108 the installer 16 couples the AU 20 to the terrain 22 by planting the AU 20. At step 110 the electronic circuit 31 generates a signal if the AU 20 was vertically planted. At step 120 the SAUI 30 triggers the GPSR 28 to determine the coordinates corresponding to the location of the AU 20 in response to the signal generated at step 110. Then, the SAUI 30 retrieves and downloads the coordinates, as noted in step 104 above.

Before generating the signal at step 110, at step 122 the pressure sensing unit 33 must detect an increase in pressure. At step 124 the electronic circuit 31 monitors the tilt switch 34 to determine if the AU 20 has been vertically planted. At step 126 the electronic circuit 31 generates a signal corresponding to a vertical plant. At step 128 the electronic circuit 31 resets the tilt switch memory 37.

Figure 6:
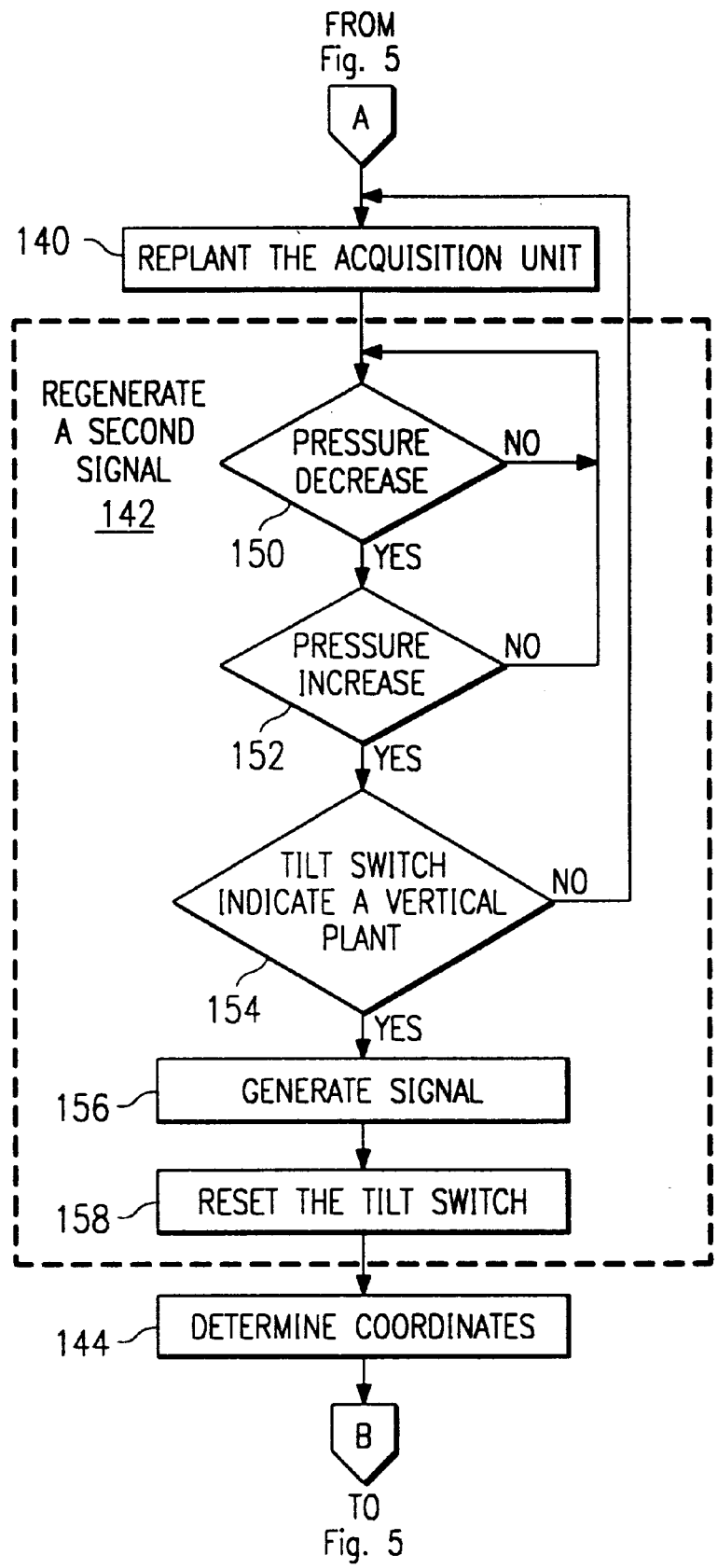
FIG. 6 is a flowchart indicating the process for replanting and downloading the coordinates to the acquisition unit.

Referring now to FIG. 6, if at step 124 the tilt switch 34 indicates that the AU 20 is not vertically planted, then at step 140 the installer 16 must replant the AU 20. At step 142 the electronic circuit 31 generates a second signal to indicate that the AU 20 is vertically planted. At step 144 the SAUI 30 uses the second signal to trigger the GPSR 28, to determine the coordinates. In order for the second signal to be generated at step 142, the pressure sensing unit 33 must detect a decrease in pressure at step 150 followed by an increase in pressure at step 152. At step 154 the electronic circuit 31 determines if the tilt switch 34 indicates that the AU 20 is planted in near vertical alignment. At step 156 the electronic circuit 31 generates a signal to indicate that the AU 20 has been planted in near vertical alignment. At step 158 the electronic circuit 31 resets the tilt switch memory. The process then proceeds to step 144 to determine the coordinates in response to the request signal, and then to step 104 where the coordinates are downloaded to the AU 20. In an alternative embodiment, the computer existing in the GPSR 28 can be programmed to implement the SAUI 30 tasks.

In another embodiment of the present invention, a tilt switch located in the planting stick 12 further enhances vertical alignment detection.

Although illustrative embodiments of the invention have been shown and described, a wide range of modifications, changes, and substitutions are contemplated in the foregoing disclosure. In some instances, some features of the present invention may be employed without a corresponding use of the other features. Accordingly, it is appropriate that the appended claims be construed broadly and in a manner consistent with the scope of the embodiments disclosed herein.

What is claimed is:

1. An apparatus for detecting seismic energy comprising:
   a. an acquisition unit for measuring seismic energy;
   b. a planting member for engaging and planting the acquisition unit; and
   c. an electronic surveying unit coupled to the planting member for determining the location of the acquisition unit.

2. The apparatus of claim 1 wherein the acquisition unit engages the planting member such that an axis of the acquisition unit is aligned with an axis of the planting member.

3. The apparatus of claim 1 wherein the acquisition unit comprises:
   a. a communication coil for communicating with the electronic surveying unit through the planting member;
   b. an electronic circuit coupled to the communication coil for recording seismic information and history of the acquisition unit; and
   c. geophone coupled to the electronic circuit for measuring seismic energy propagation through a field.

4. The apparatus of claim 3 wherein the electronic circuit comprises:
   a. a power source for supplying power to the acquisition unit during remote operation;
   b. a central processing unit coupled to the power source and the communication coil for processing and storing information;
   c. a tilt switch coupled to the central processing unit for determining vertical alignment of the acquisition unit; and
   d. a collection unit coupled to the geophone and the central processing unit for recording the measured seismic energy.

5. The apparatus of claim 3 wherein the acquisition unit further comprises:
   a. a telemetry unit coupled to the central processing unit for transmitting and receiving information to and from a remote source; and
   b. an antenna coupled to the telemetry unit for enhancing transmission and reception.

6. The apparatus of claim 1 wherein the acquisition unit comprises:
   a. a housing for encasing an electronic circuit;
   b. at least two catches attached to an outside upper portion of the housing for engaging the planting member; and
   c. a spike extending from a lower end of the housing for coupling the acquisition unit to a field for detection of the seismic energy.

7. The apparatus of claim 6 wherein the acquisition unit further comprises:
   a. a communication coil for receiving coordinates from the electronic surveying unit;
   b. a central processing unit coupled to the communication coil for storing and processing data;

c. a tilt switch having an electronic latch coupled to the central processing unit for determining if the acquisition unit has deviated from vertical;

d. a collection unit coupled to the central processing unit for storing measurements detected by the acquisition unit;

e. a geophone coupled to the collection unit for measuring the seismic energy;

f. a telemetry unit coupled to the central processing unit for transmitting and receiving data; and g. an antenna coupled to the telemetry unit.

8. The apparatus of claim 1 wherein the head portion comprises:

a. a head communication coil secured in the head portion for communicating with the acquisition unit; and b. a pressure sensing unit secured in the head portion for detecting pressure changes imposed on the head portion during planting of the acquisition unit.

9. The apparatus of claim 1 wherein the head portion includes at least two notches defined in an inner surface thereof for engaging the acquisition unit.

10. The apparatus of claim 1 wherein the handle portion includes a tilt switch for detecting whether the vertical alignment of the acquisition unit is within a tolerance margin.

11. The apparatus of claim 10 wherein the tolerance margin is fifteen degrees from vertical.

12. The apparatus of claim 11 wherein the planting member automatically releases the acquisition unit when the signal is received.

13. A method for planting and locating an acquisition unit in near vertical alignment in a field comprising the steps of:

a. engaging the acquisition unit with a planting member;

b. coupling an electronic surveying unit to the planting member;

c. planting the acquisition unit in a field in near vertical alignment using the planting member; and d. downloading coordinates from the electronic surveying unit to the planted acquisition unit.

14. The method of claim 13 wherein the step of planting comprises the steps of:

a. mounting the acquisition unit on a head portion of the planting member;

b. coupling the acquisition unit to the field using the planting member;

c. generating a first signal in response to a tilt switch of the acquisition unit indicating that the acquisition unit is in near vertical alignment within a tolerance range; and d. determining positioning coordinates for the acquisition unit in response to the first signal.

15. The method of claim 14 wherein the step of generating a first signal comprises the steps of:

a. detecting an increase in pressure between the acquisition unit and the planting member;

b. monitoring a tilt switch to determine whether the acquisition unit has been planted in near vertical alignment within the tolerance range to generate the signal; and c. resetting the tilt switch to indicate that the acquisition unit has been planted in near vertical alignment within the tolerance range.

16. The method of claim 14 further comprising the steps of:

a. replanting the acquisition unit in response to the tilt switch indicating that the acquisition unit was not planted in near vertical alignment within the tolerance range;

b. generating a second signal in response to the tilt switch indicating that the replanted acquisition unit is in near vertical alignment within the tolerance range; and c. determining the coordinates in response to the second signal.

17. The method of claim 16 wherein the step of generating a second signal comprises the steps of:

a. detecting, in sequence, a decrease and an increase in pressure between the acquisition unit and the planting member to indicate that the acquisition unit has been replanted;

b. monitoring the tilt switch to determine whether the acquisition unit has been replanted in near vertical alignment within the tolerance range to generate the second signal; and c. resetting the tilt switch to indicate that the acquisition unit has been planted in near vertical alignment within the tolerance range.

18. The method of claims 15 wherein the tolerance range is a fifteen degree deviation from the vertical.

19. The method of claim 13 further comprising the step of separating the acquisition unit from the planting member after the acquisition unit has been planted in near vertical alignment within a tolerance range.

20. An apparatus for detecting seismic energy comprising:
an acquisition unit for measuring seismic energy;
a planting member for engaging and planting the acquisition unit, including:
a handle portion;
a head portion extending from the handle portion; and
a cable coupled to the handle portion for communication between the acquisition unit and the electronic surveying unit; and
an electronic surveying unit coupled to the planting member for determining the location of the acquisition unit.

21. An apparatus for detecting seismic energy comprising:
an acquisition unit for measuring seismic energy;
a planting member for engaging and planting the acquisition unit; and
an electronic surveying unit coupled to the planting member for determining the location of the acquisition unit, including:
a global positioning satellite receiver for determining coordinates for a specific location; and
an interface unit coupled to the global positioning satellite receiver and the planting member for triggering the global position satellite receiver to obtain the coordinates in response to receiving a signal from the acquisition unit.

* * * * *